US006142352A

United States Patent [19]

Larson et al.

[11] Patent Number: 6,142,352

[45] Date of Patent: Nov. 7, 2000

[54] ROOFING WASHER-DISPENSING AND FASTENER-DRIVING MACHINE

[75] Inventors: Paul M. Larson, Hoffman Estates; Riaz Hasan, Palatine; Sigismund G. Paul, Park Ridge, all of Ill.

[73] Assignee: Illinois Tool Works Inc., Glenview, Ill.

[21] Appl. No.: 09/262,885

[22] Filed: Mar. 8, 1999

Related U.S. Application Data

[62] Division of application No. 09/074,011, May 5, 1998, Pat. No. 5,921,454.

[51] Int. Cl.[7] .................... B65G 59/00

[52] U.S. Cl. .................... 227/15; 227/116; 227/120; 227/128; 81/57.37; 81/435

[58] Field of Search .................... 227/15, 48, 50, 227/110, 127, 128, 120, 116; 81/57.37, 435, 433, 434; 29/809; 221/198, 197, 270, 271; 144/245.1

[56] References Cited

U.S. PATENT DOCUMENTS

| | | | |
|---|---|---|---|
| Re. 16,325 | 4/1926 | Oehm et al. | 227/114 |
| 1,441,250 | 1/1923 | Smith | 81/57.37 |
| 1,515,025 | 11/1924 | Foy | 81/57.37 |
| 1,711,935 | 5/1929 | Gavin | 227/115 |
| 1,793,236 | 2/1931 | McDonough | 81/57.37 |
| 2,261,134 | 11/1941 | Blair | 81/57.37 |
| 2,266,302 | 12/1941 | Blair | 81/57.37 |
| 2,314,760 | 3/1943 | Blair | 81/57.37 |
| 2,385,521 | 9/1945 | Mead | 144/245.1 |
| 2,886,815 | 5/1959 | Young | 227/120 |
| 2,922,447 | 1/1960 | Moore | 81/435 |
| 2,989,996 | 6/1961 | Dixon | 81/57.37 |
| 3,249,280 | 5/1966 | Cabot et al. | 227/138 |
| 3,291,358 | 12/1966 | Rabelow et al. | 227/120 |
| 3,581,370 | 6/1971 | Passarella et al. | 81/57.37 |
| 3,587,683 | 6/1971 | Bangerter et al. | 81/430 |
| 3,595,460 | 7/1971 | Pitkin | 227/48 |
| 3,633,810 | 1/1972 | Krakauer | 227/120 |
| 3,960,191 | 6/1976 | Murray | 81/57.37 |
| 4,033,499 | 7/1977 | Butler | 227/120 |
| 4,236,555 | 12/1980 | Dewey | 81/431 |
| 4,397,412 | 8/1983 | Dewey | 81/57.37 |
| 4,870,750 | 10/1989 | Zahn | 227/15 |
| 4,890,968 | 1/1990 | Beach et al. | 411/531 |
| 5,025,969 | 6/1991 | Koester et al. | 227/120 |
| 5,042,142 | 8/1991 | Beach et al. | 227/120 |
| 5,056,684 | 10/1991 | Beach et al. | 221/197 |

(List continued on next page.)

*Primary Examiner*—Peter Vo
*Assistant Examiner*—Jim Calve
*Attorney, Agent, or Firm*—Rockey, Milnamow & Katz, Ltd.

[57] ABSTRACT

In a roofing washer-dispensing and fastener-driving machine, which has a fastener-feeding tube, a fastener-engaging pawl is mounted operatively to the tube, near its upper end. The pawl is pivotable between a normal position wherein the pawl is arranged to engage a fastener dropped into the tube so as to prevent the fastener from dropping through the tube and a pivoted position wherein the pawl is arranged to disengage from the fastener. An elongate rod is arranged to pivot the pawl from the normal position into the pivoted position when the machine is operated. In the same machine, a magazine adapted to hold a stack of such washers is improved so as to have a bridge mounted pivotably to one of two side walls of the magazine and a cover is mounted adjustably to the bridge, so that the cover in an upwardly adjusted position is inserted into the magazine, above a stack of such washers in the magazine, when the bridge spans the side walls and so that the cover is removed from the magazine when the bridge is pivoted to a position wherein the bridge does not span the side walls. The cover is mounted to the bridge via a rod, along which the cover is movable. In the same machine, a shuttle adapted to be reciprocatingly driven is improved so as to have a transverse groove, in which an elongate brace having a pivot pin at each end is fixed by fasteners so as to bear against the leading and trailing edges of the groove, and a transverse rib adapted to engage the lowermost washer in a stack in the magazine is defined by a removable element.

7 Claims, 6 Drawing Sheets

U.S. PATENT DOCUMENTS

| | | | |
|---|---|---|---|
| 5,058,464 | 10/1991 | McGovern et al. | 81/435 |
| 5,101,697 | 4/1992 | Fishback | 81/433 |
| 5,267,391 | 12/1993 | Ingraham | 227/120 |
| 5,347,707 | 9/1994 | Beach | 29/809 |
| 5,445,297 | 8/1995 | Beach et al. | 221/270 |
| 5,555,780 | 9/1996 | Beach et al. | 81/57.37 |
| 5,660,090 | 8/1997 | Deri | 81/434 |
| 5,673,816 | 10/1997 | Larson et al. | 221/197 |
| 5,791,546 | 8/1998 | McGuinness et al. | 227/138 |

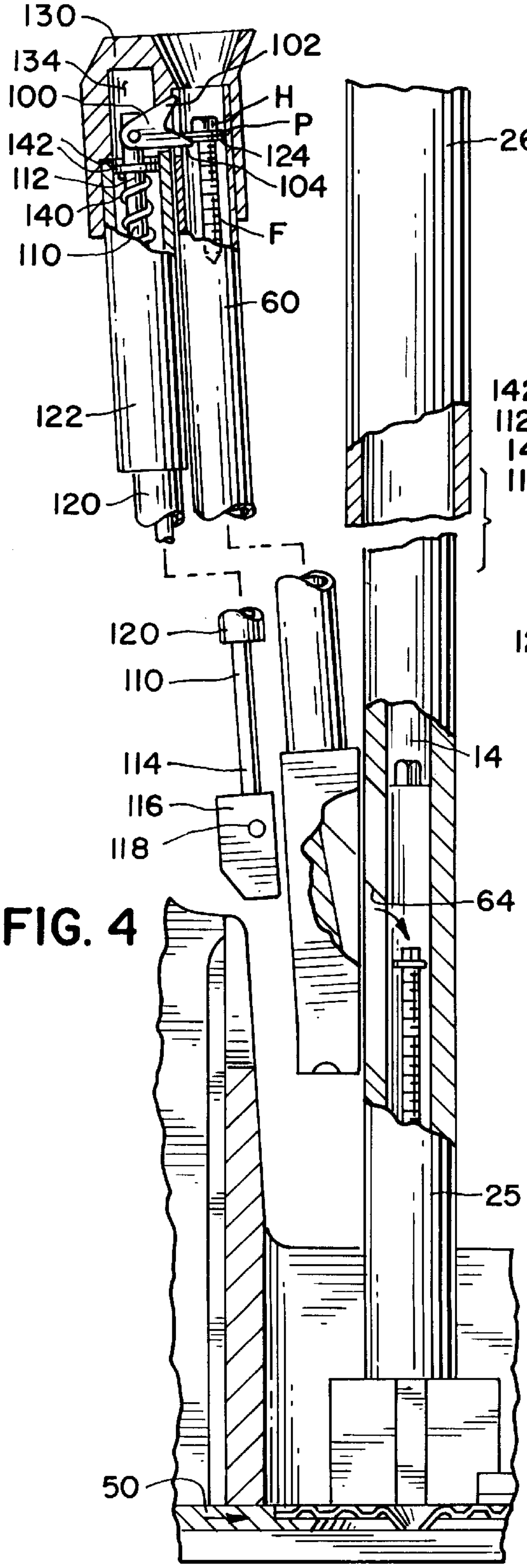
FIG. 4
FIG. 5
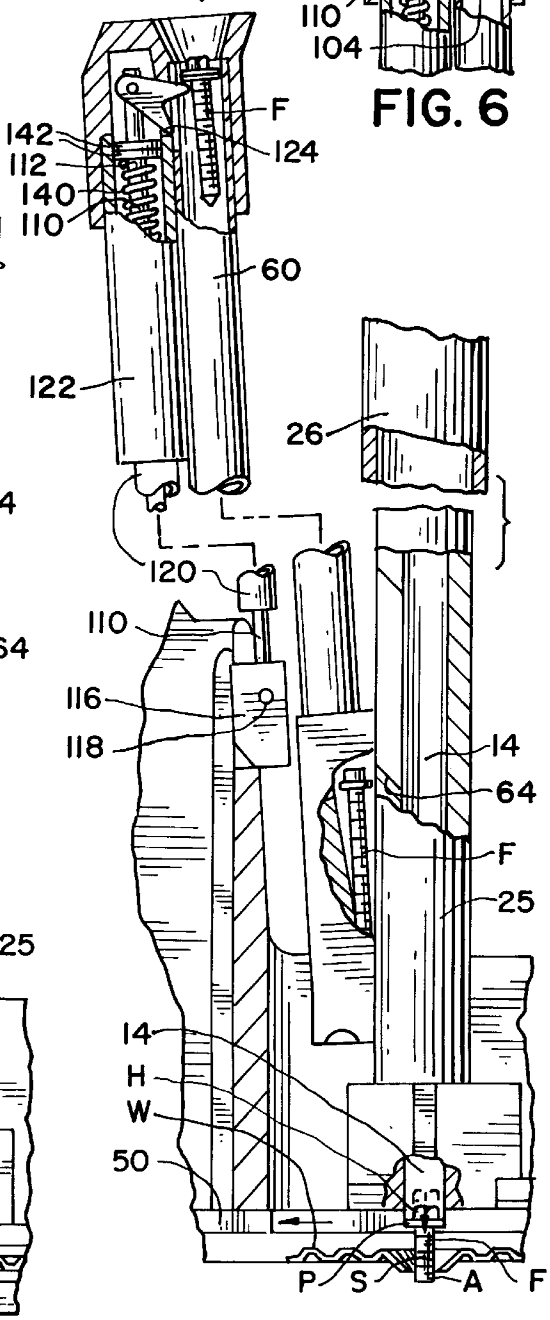
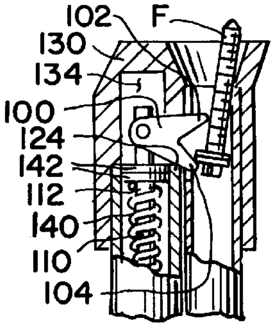
FIG. 6

FIG. 7
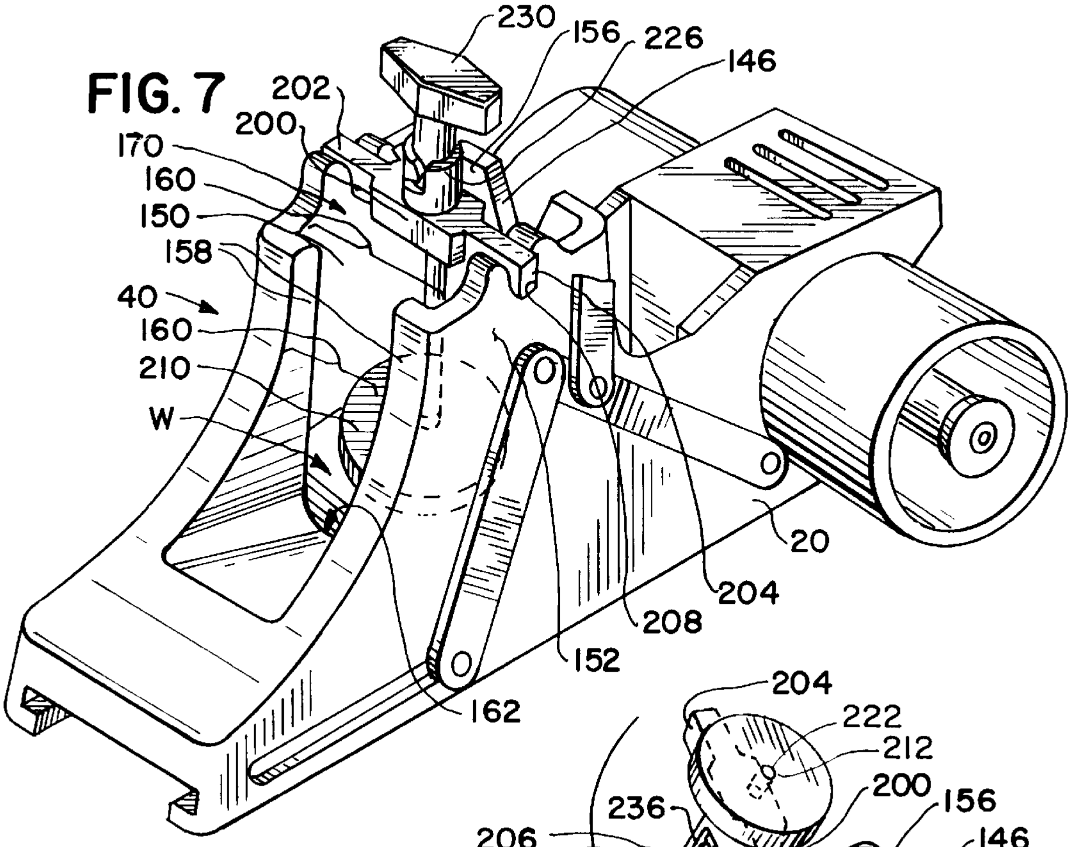
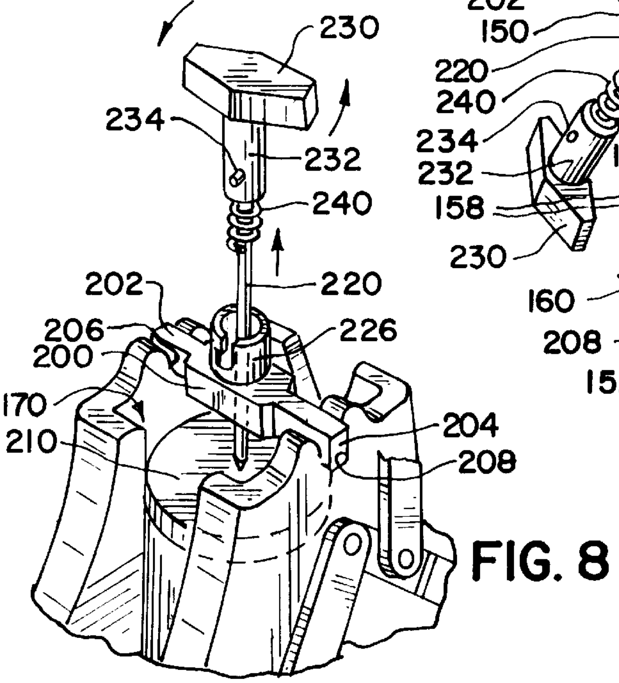
FIG. 8
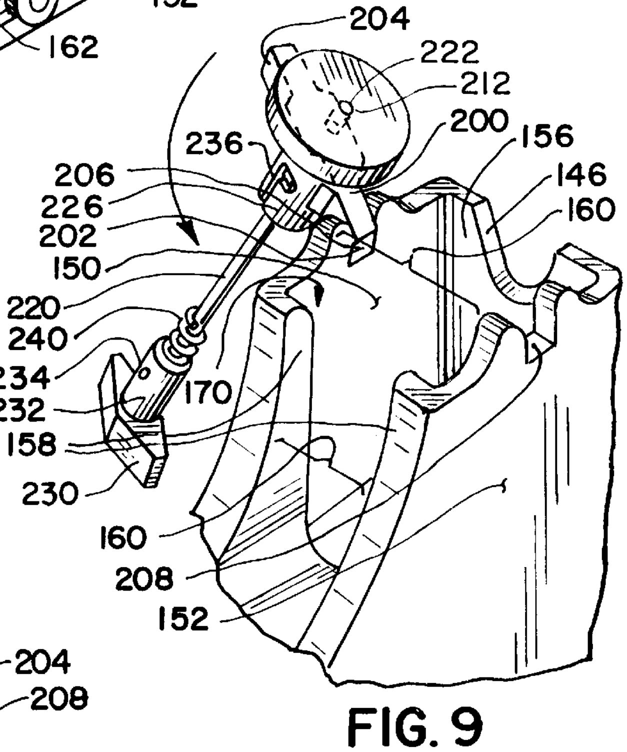
FIG. 9

FIG. 10
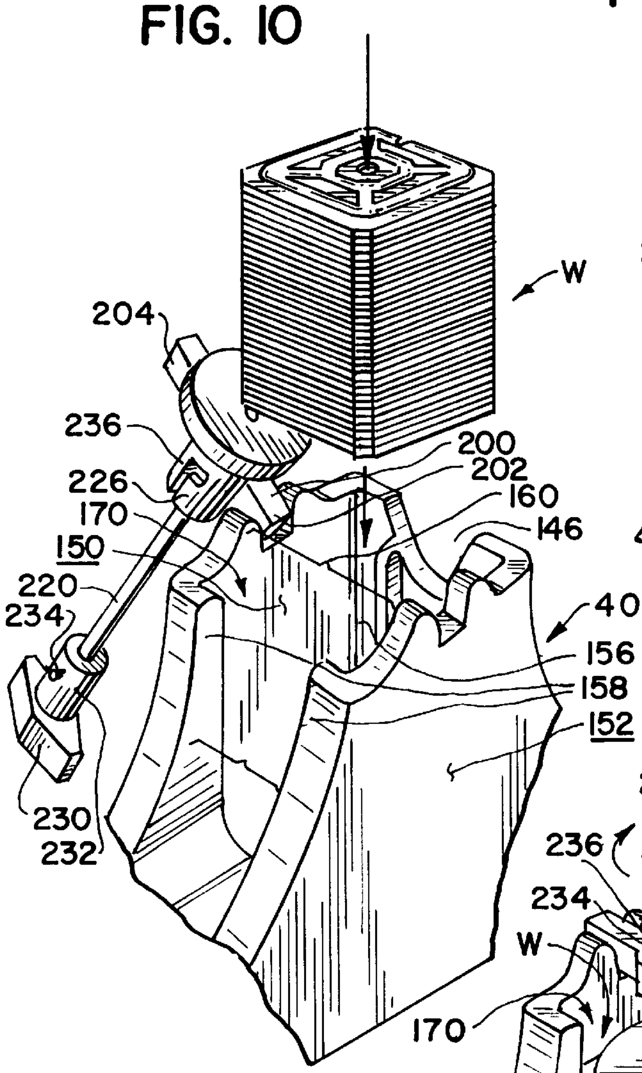
FIG. 11
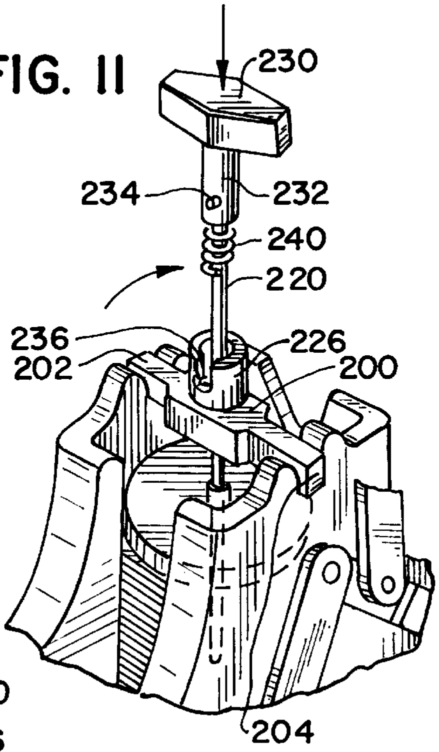
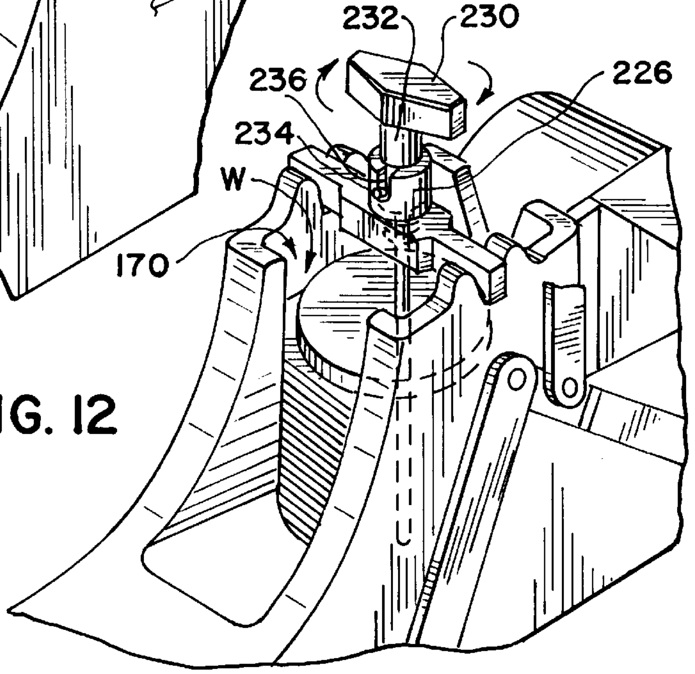
FIG. 12

ROOFING WASHER-DISPENSING AND FASTENER-DRIVING MACHINE

This is a divisional application of patent application Ser. No. 09/074,011 filed May 5, 1998, now U.S. Pat. No. 5,921,454.

TECHNICAL FIELD OF THE INVENTION

This invention pertains to improvements in a machine for dispensing stackable roofing washers individually from a stack of such washers and for driving fasteners through such washers. Such a machine is useful for fastening one or more layers of roofing material to an underlayment.

BACKGROUND OF THE INVENTION

An earlier version of a machine for dispensing stackable roofing washers individually from a stack of such washers and for driving fasteners through such washers is exemplified in Beach et al. U.S. Pat. Nos. 4,890,968, 5,042,142, and 5,056,684. A later version of such a machine is exemplified in Beach et al. U.S. Pat. Nos. 5,347,707, 5,445,297, and 5,555,780.

Generally, as known from at least some of the aforementioned Beach et al. patents, such a machine comprises a screw gun and an driving bit, which is mounted operatively to the screw gun and which is adapted to be rotatably driven by the screw gun and to drive a fastener rotatably when engaged with the fastener and driven by the screw gun.

Moreover, as known from at least some of the aforementioned Beach et al. patents, such a machine comprises a base, an upper, upright, tubular member having an upper end and mounting the screw gun at the upper end with the driving bit extending downwardly through the upper member, a middle, upright, tubular member having an upper end fitting inside the upper member, and a lower, upright, tubular member having an upper end fitting inside the middle member and a lower end mounted operatively to the base. The upper member is telescoped over the middle member and the middle member is telescoped over the lower member with the driving bit extending into the lower member.

Thus, the upper member is movable upwardly and downwardly over a limited range of vertical movement relative to the middle member, and the middle member is movable upwardly and downwardly over a limited range of vertical movement relative to the lower member. The tubular members of the machine are operated between a fully extended state where the upper and middle members are in their upper positions, wherein the driving bit does not extend through the lower end of the lower member, and a fully compressed state where the upper and middle members are biased to their lower positions, wherein the driving bit extends through the lower end of the lower member. The upper and middle members are biased to the fully extended state but are movable to the fully compressed state when the screw gun is depressed.

Furthermore, as known from at least some of the aforementioned Beach et al. patents, such a machine comprises a fastener-feeding tube, which is mounted operatively to the middle member and which is adapted to be vertically movable with the middle member, to receive a fastener if the fastener is dropped into an upper end of the fastener-feeding tube so that the shank of the fastener precedes the head of the fastener, and to guide the fastener into the lower member, below the driving bit, when the upper member is moved to the lower position.

Generally, as known from at least some of the aforementioned Beach et al. patents, such a machine comprises a magazine, which is integrated with the base, which is adapted to receive a stack of said washers inserted through an upper aperture of the magazine, to hold the stack, and to allow a lowermost washer in the stack to be laterally displaced from a lower region of the magazine, and which has two side walls spaced from each other.

Moreover, as known from at least some of the aforementioned Beach et al. patents, such a machine has a shuttle, which is adapted to be reciprocatingly driven between a washer-engaging position wherein a transverse rib of the shuttle engages the lowermost washer of the stack and a washer-releasing position wherein the shuttle releases the last-mentioned washer, and a transverse brace disposed across the shuttle, fixed to the shuttle by at least one fastener, and having a pivot pin at each end of the transverse brace. Thus, when the shuttle is driven between the washer-engaging and washer-releasing position, the fastener is stressed. Also, as the machine is used, the transverse rib tends to become worn.

Fastener-driving machines of related interest (without washer-dispensing capability) are exemplified in Murray U.S. Pat. No. 3,960,191 and in Dewey U.S. Pat. Nos. 4,236,555 and 4,397,412.

SUMMARY OF THE INVENTION

This invention provides improvements in a machine for dispensing stackable roofing washers individually from a stack of such washers and for driving fasteners through such washers, as discussed above. Except as disclosed herein, the machine may conform to any of the roofing washer-dispensing and fastener-driving machines disclosed in the aforenoted Beach et al. patents. This invention has several aspects, as discussed below.

According to a first aspect of this invention, a fastener-driving machine (with or without washer-dispensing capability) is similar to known fastener-driving machines in that the fastener-driving machine comprises a screw gun, a driving bit, a base, and tubular members including an upper member and a lower member. The upper member mount the screw gun at an upper end. The tubular members are adapted to telescope between a fully extended state, in which the driving bit does not extend through the lower end of the lower member, and a fully compressed state, in which the driving bit extends through the lower end of the lower member. The upper member is biased to an upper position but is movable to a lower position when the screw gun is depressed. A fastener-feeding tube is mounted operatively to and adapted to be vertically movable with one of the tubular members, to receive a fastener if the fastener is dropped into an upper end of the fastener-feeding tube so that the shank of the fastener precedes the head of the fastener, and to guide the fastener into the lower member, below the driving bit, when the upper member is moved to the lower position.

According to the first aspect of this invention, the fastener-driving machine further comprises a fastener-engaging pawl, which is mounted operatively near the upper end of the fastener-feeding tube. The fastener-engaging pawl is pivotable between a normal position, into which the fastener-driving pawl is biased, and a pivoted position.

In the normal position, the fastener-engaging pawl is adapted to engage the fastener so dropped so as to prevent the fastener so dropped from dropping through the fastener-feeding tube. In the pivoted position, the fastener-engaging pawl is adapted to disengage from the same fastener so dropped so as to permit the same fastener to drop through the fastener-feeding tube, into the lower member, below the driving bit, the fastener-engaging pawl being biased to the normal position.

According to the first aspect of this invention, the same machine also comprises an elongate rod, which is mounted operatively to the fastener-engaging pawl and adapted to pivot the fastener-engaging pawl from the normal position into the pivoted position when the upper member is moved to the lower position.

Preferably, the fastener-engaging pawl is bifurcated so as to have an upper arm and a lower arm. Therefore, the lower arm is adapted to engage the head of a first fastener so dropped so as to prevent the first fastener from dropping through the fastener-feeding tube with the fastener-engaging pawl in the normal position. Also, the lower arm is adapted to disengage from the head of the first fastener so as to permit the first fastener to drop through the fastener-driving tube with the fastener-engaging pawl in the pivoted position.

Moreover, the upper arm is positioned to engage the head of a second fastener so dropped after the first fastener so as to prevent the second fastener from being fed gravitationally past the upper end of the fastener-feeding tube with the fastener-engaging pawl in the pivoted position. Also, the upper arm is adapted to disengage from the head of the second fastener so as to permit the second fastener to drop until the lower arm engages the head of the second fastener with the fastener-engaging pawl in the normal position.

Preferably, moreover, the upper and lower arms of the fastener-engaging pawl are adapted respectively to engage the shank of an inverted fastener and the head of the inverted fastener, if the inverted fastener dropped into the fastener-feeding tube so that the head of the inverted fastener precedes the shank of the inverted fastener with the fastener-engaging pawl in the normal position, so as to cause the inverted fastener and the fastener-engaging pawl to bind but to permit the inverted fastener to be upwardly pulled from the fastener-feeding tube.

According to a second aspect of this invention, a washer-dispensing machine (with or without fastener-driving capability) comprising a base and a magazine, as described above, further comprises a bridge and a cover, which is mounted to the bridge. The bridge is mounted pivotably to a first of the side walls of the magazine so as to be pivotably movable between a position wherein the bridge spans the upper aperture of the magazine and wherein the bridge rests on the second of the side walls of the magazine and a range of positions wherein the bridge does not span the upper aperture of the magazine. The cover is mounted to the bridge so that the cover is inserted into the magazine, beneath the bridge, above the stack when the bridge is pivoted to the position wherein the bridge spans the upper aperture of the magazine, and so that the cover is removed from the magazine when the bridge is pivoted to the range of positions wherein the bridge does not span the upper aperture of the magazine.

Preferably, the cover is mounted movable to the bridge so as to enable the cover to be upwardly and downwardly moved between positions that become a lowered position relative to the bridge and a raised position relative to the bridge when the bridge is pivoted to the position wherein the bridge spans the upper aperture of the magazine.

Preferably, moreover, the washer-dispensing machine further comprises a rod defining an axis and having two ends that become a lower end and an upper end respectively when the bridge is pivoted to the position wherein the bridge spans the upper aperture of the magazine. The cover is mounted so as to be axially movable along the rod. The rod extends through a hole in the bridge so as to enable the rod to be upwardly and downwardly moved when the bridge is pivoted to the position wherein the bridge spans the upper aperture of the magazine. Also, the rod is latchable releasably in the position that becomes the lowered position. Moreover, the cover is biased gravitationally along the rod when the bridge is pivoted to the position wherein the bridge spans the upper aperture of the magazine, so as to bias a stack of washers downwardly in the magazine.

According to a third aspect of this invention, a washer-dispensing machine (with or without fastener-driving capability) comprising a magazine, a shuttle, and a transverse brace disposed across the shuttle and fixed to the shuttle by at least one fastener or by a pair of similar fasteners, as described above, is improved by the shuttle having a transverse groove defining a leading edge and a trailing edge, by the transverse brace being fixed within the transverse groove by said fastener so as to bear against the leading and trailing edges, and by the transverse brace projecting above the transverse groove.

According to a fourth aspect of this invention, a washer-dispensing machine (with or without fastener-driving capability) comprising a magazine, a shuttle having a transverse rib, as described above, is improved by the transverse rib being defined by an elongate element fixed removably within a transverse groove in the shuttle. The elongate element may be removably fixed within the transverse groove by a pair of similar fasteners.

The first, second, third, and fourth aspects of this invention may be advantageously combined in a roofing washer-dispensing and fastener-driving machine, as exemplified in the aforementioned Beach et al. patents, the disclosures of which are incorporated herein by reference. The first aspect of this invention may be advantageously embodied in a fastener-driving machine, as exemplified in the aforenoted Murray and Dewey patents, the disclosures of which are incorporated herein by reference.

These and other objects, features, and advantages of this invention are evident from the following description of a preferred embodiment of this invention, with reference to the accompanying drawings.

BRIEF DESCRIPTION OF THE DRAWINGS

FIGS. 3, 4, and 5, on a similar scale, are views similar to FIG. 2 but showing certain elements of the machine in changed positions. Two similar fasteners are shown in FIGS. 3, 4, and 5, as inserted properly and successively into the fastener-feeding tube.

FIG. 6, on a similar scale, is a fragmentary detail showing certain elements of the machine in changed positions. A fastener is shown in FIG. 6, as inverted when inserted into the fastener-feeding tube.

FIG. 7, on a larger scale compared to FIG. 1, is a fragmentary, perspective view of a magazine of the machine shown in FIG. 1, at one stage in its operation.

FIGS. 8 through 12, on a similar scale, are fragmentary, perspective views of the magazine, at other stages in its operation.

DETAILED DESCRIPTION OF THE PREFERRED EMBODIMENT

Figure 1:
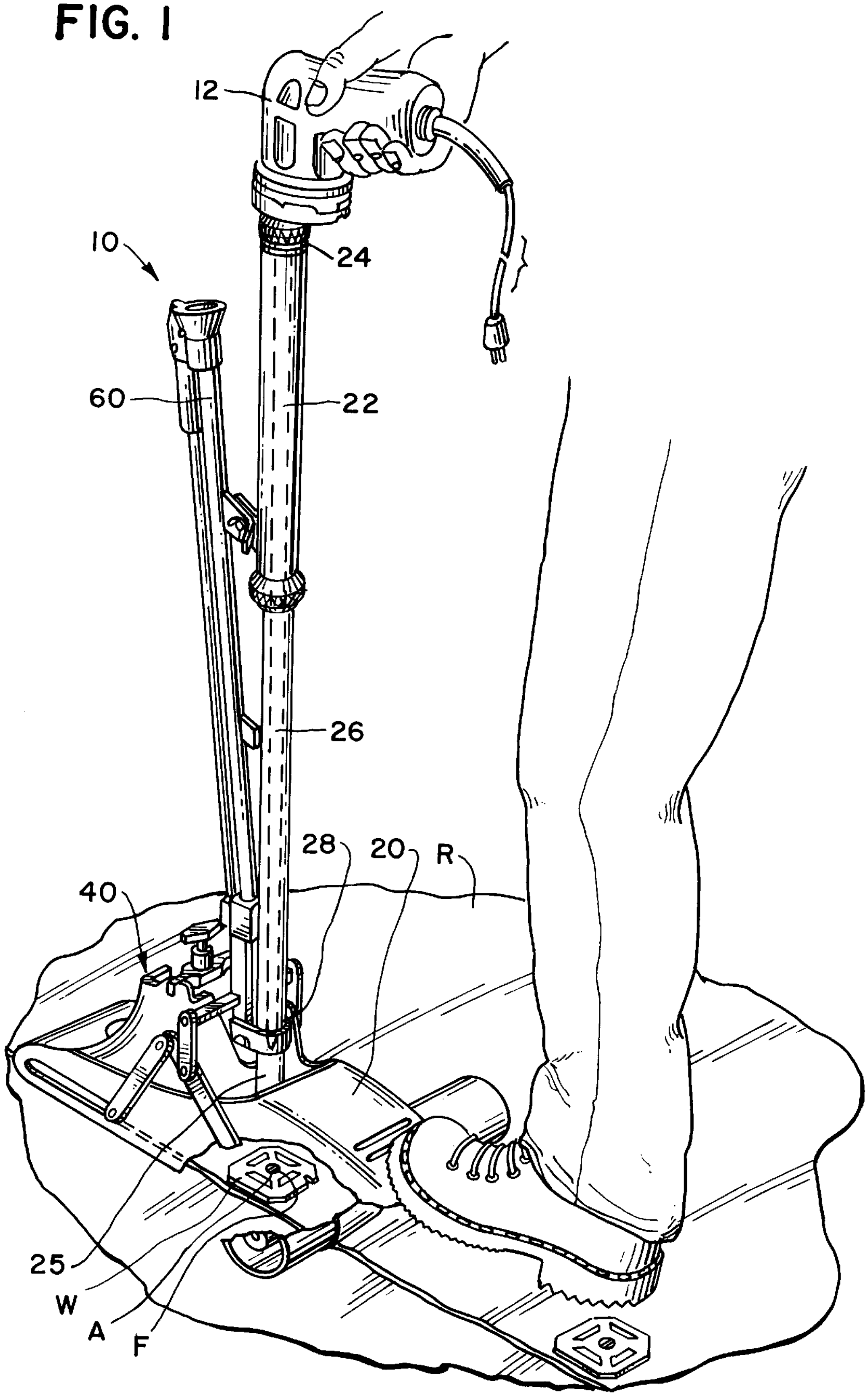
FIG. 1 is a fragmentary, perspective view of a worker standing on a roof and operating a roofing washer-dispensing and fastener-driving machine constituting a preferred embodiment of this invention.

As shown in FIG. 1 and other views, a roofing washer-dispensing and fastener-driving machine 10 constituting a preferred embodiment of this invention is useful by a worker standing on a roof R for dispensing stackable roofing washers W individually onto the roof R and for driving fasteners F (see FIGS. 2 through 6) into the roof R, so as to fasten one or more layers of roofing material, into an underlayment.

The washers W, which are generally square with central apertures A, conform to the washers disclosed in the aforenoted Beach et al. patents. The fasteners F are conventional roofing screws, each having a threaded shank S and a hexagonal head H having an integral, annular, washer portion P with a cross-section greater than the cross-section of the shank S. Suitable screws are available commercially from ITW Buildex (a division of Illinois Tool Works Inc.) of Itasca, Ill. under its HEXTRA trademark.

Except as disclosed herein, the machine 10 may conform to any of the roofing washer-dispensing and fastener-driving machines disclosed in the aforenoted Beach et al. patents. The machine 10 is similar to the machines disclosed therein in comprising a screw gun 12 and a driving bit 14, which is mounted operatively to the screw gun 12 and which is adapted to be rotatably driven by the screw gun 12 and to drive a fastener F rotatably when engaged with the fastener F and driven by the screw gun 12. The machine 10 also is similar to the machines disclosed therein in comprising a base 20, an upper, upright, tubular member 22 having an upper end 24 and mounting the screw gun 12 at the upper end 24 with the driving bit 14 extending downwardly through the upper member 22, the middle member 26, and a lower, upright, tubular member 25 having a lower end 27 mounted operatively to the base 20. The upper member 22 is telescoped over the middle member 26. The middle member 26 is telescoped over the lower member 25 with the driving bit extending downwardly into the lower member 25. The upper member 22 is movable upwardly and downwardly over a limited range of vertical movement relative to the middle member 26. The middle member 26 is movable upwardly and downwardly over a limited range of vertical movement relative to the lower member 25. Thus, when the upper member 22 and the middle member 26 are in their upper positions, the tubular members of the machine 10 are fully extended and the driving bit 14 does not extend through the lower end 27 of the lower member 25. Also, when the upper member 22 and the middle member 26 are in their lower positions, the tubular members of the machine 10 are fully compressed (see FIG. 3) and the driving bit 14 extends through the lower end 27 of the lower member 25. In a manner disclosed in the aforementioned Beach et al. patents, the upper member 22 and the middle member 26 are biased by an internal spring not shown) to the fully extended state but are movable to the fully compressed state when the screw gun 12 is depressed.

Figure 13:
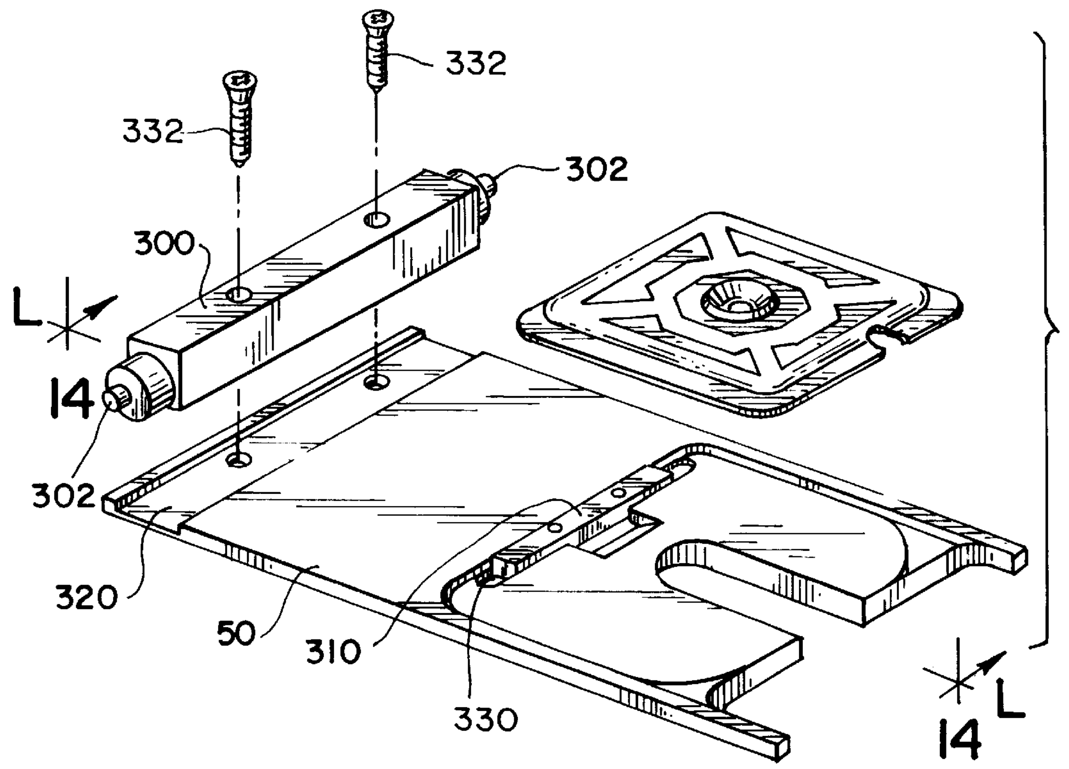
FIG. 13 is a fragmentary, exploded, perspective view of a shuttle and related elements of the machine.
Figure 14:
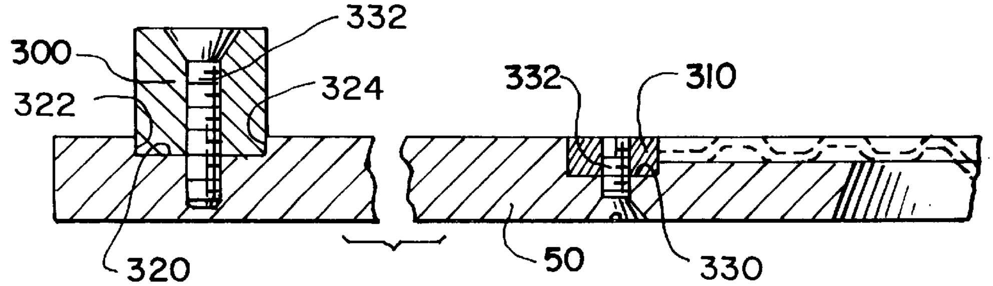
FIG. 14 is a sectional view taken along line 14—14 of FIG. 13, in a direction indicated by arrows.

Moreover, the machine 10 is similar to the machines disclosed in the aforenoted Beach et al. patents in comprising a magazine 40 (see FIGS. 7, 8, and 9) integrated with the base and adapted to receive a stack of the aforementioned washers W and a shuttle 50 (see FIGS. 13 and 14) mounted movably to the base 20 and adapted to be reciprocatingly movable driven between a washer-engaging position wherein the shuttle 50 engages the lowermost washer W of the stack and a washer-releasing position wherein the shuttle 50 releases the last-mentioned washer W. The machine 10 comprises shuttle-biasing, shuttle-moving, and fastener-driving mechanisms similar to shuttle-biasing, shuttle-moving, and fastener-driving mechanisms disclosed in the aforementioned Beach et al. patents. As disclosed therein, when the screw gun 12 is depressed, those mechanisms dispense the lowermost washer W from the stack and position the driving bit 14 to drive a fastener F into the roof R, so as to fasten one or more layers of roofing material, into an underlayment, when the screw gun 12 is operated.

The machine 10 comprises a fastener-feeding tube 60, which is mounted operatively to the tubular member 26, in a manner disclosed in Beach et al. U.S. Pat. No. 4,890,968. Thus, the fastener-feeding tube 60 is adapted to be vertically movable with the middle member 26, to receive a fastener F if the fastener F is dropped into the upper end 62 of the fastener-feeding tube 60 so that the shank S of the fastener F precedes the head H of the fastener F, and to guide the fastener F into the lower member 25, through a vertical slot 64 in the lower member 25, below the driving bit 14, when the screw gun 12 is depressed so that the upper member 22 is moved from the upper position into the lower position.

The machine 10 is improved over the machines disclosed in the aforementioned Beach et al. patents in comprising a fastener-engaging pawl 100, which is mounted operatively near the upper end 62 of the fastener-feeding tube 60. The fastener-engaging pawl 100 is pivotable between a normal position, into which the fastener-driving pawl 100 is biased, and a pivoted position.

In the normal position, the fastener-engaging pawl 100 is adapted to engage the fastener F so dropped so as to prevent the fastener F so dropped from dropping through the fastener-feeding tube 60. In the pivoted position, the fastener-engaging pawl 100 is adapted to disengage from the same fastener F so dropped so as to permit the same fastener F to drop through the fastener-feeding tube 60, into the lower member 25, below the driving bit 14, via the vertical slot 64. The fastener-engaging pawl 100 is biased to the normal position, in a manner described below, but is pivotable from the normal position into the pivoted position.

Figure 2:
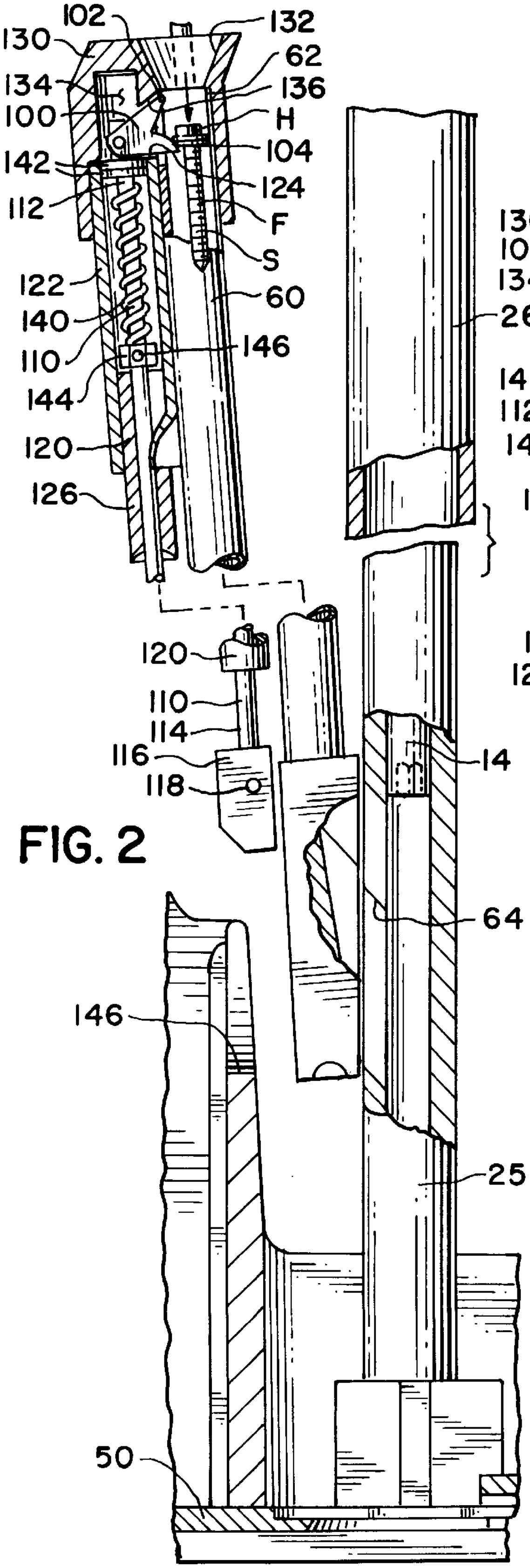
FIG. 2, on a larger scale compared to FIG. 1, is a fragmentary, partly sectional, partly elevational view showing certain elements of the machine shown in FIG. 1, which elements include a fastener-feeding tube, a fastener-engaging pawl, and an elongate rod coacting with the fastener-engaging pawl. A fastener is shown in FIG. 2, as inserted properly into the fastener-feeding tube.
Figure 3:
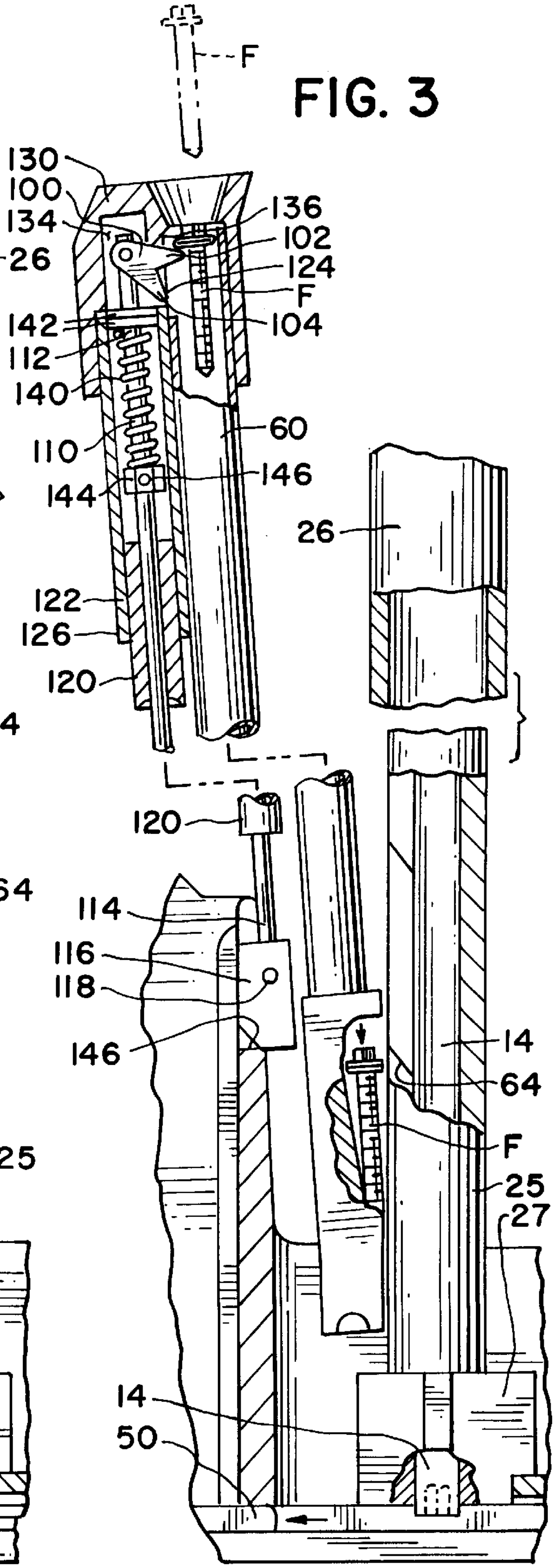

As shown in FIGS. 2 and 3, the fastener-engaging pawl 100 is mounted pivotably to an elongate rod 110, at an upper end 112 of the rod. The elongate rod 110, which defines an axis, is mounted slidably within an inner sleeve 120. At a lower end 114 of the elongate rod 110, a contact block 116 is mounted via a set screw 118. The inner sleeve 120 is welded to an outer sleeve 122, which is welded to the fastener-feeding tube 60 near the upper and lower ends 124, 126, of the outer sleeve 122 and at an intermediate location. A mouthpiece 130, which is cast from a suitable metal and which is mounted at the upper ends of the fastener-feeding tube 60 and of the outer sleeve 122, defines a flared mouth 132 opening into the fastener-feeding tube 60 and an internal cavity 134, in which the fastener-engaging pawl 100 is pivotable between the normal and pivoted positions noted above.

When pivoting from the normal position into the pivoted position, the fastener-engaging pawl 100 engages an internal surface 136 of the mouthpiece 130. When pivoting from the pivoted position into the normal position, the fastener-engaging pawl 100 engages the upper end 124 of the outer sleeve 122. A coiled spring 140, which is deployed around the elongate rod 110, between two stacked washers 142 bearing upwardly against the mouthpiece 130 and a collar 144 affixed around and to the elongate rod 110 via a set screw 146, biases the elongate rod 110 downwardly so as to bias the fastener-engaging pawl 100 into the normal position.

When the screw gun 12 is depressed so that the upper member 22 is moved from the upper position into the lower position, the inner and outer sleeves 120, 122, are moved downwardly with the upper member 22. Further, the elongate rod 110 moved downwardly with the inner and outer sleeves 120, 122, until the contact block 116 engages the base 20 within an upwardly opening recess 146 defined by the base 20, whereupon the elongate rod 110 is moved upwardly within the inner sleeve 120 (which continues to move downwardly for a further distance) so as to pivot the fastener-engaging pawl 100 from the normal position into the pivoted position.

As shown in FIGS. 3 through 6, the fastener-engaging pawl 100 is bifurcated so as to have an upper arm 102 and a lower arm 104. As shown in FIGS. 2 and 4, when the fastener-engaging pawl 100 is positioned in its normal position, the upper arm 102 is positioned so as not to interfere with a fastener F being dropped into the fastener-feeding tube 60 via the mouthpiece 130 and the lower arm 104 is positioned so as to engage the head H of a fastener F dropped properly (with its shank S preceding its head H) into the fastener-feeding tube 60, thereby to prevent the same fastener F from dropping through the fastener-feeding tube 60. As shown in FIGS. 3 and 5, when the fastener-engaging pawl 100 is pivoted from its normal position into its pivoted position, the lower arm 104 disengages from the head H of such a fastener F so as to permit the same fastener F to drop through the fastener-feeding tube 60 and the upper arm 102 becomes positioned to engage the head H of a second fastener F dropped properly (with its shank S preceding its head H) into the fastener-feeding tube 60, thereby to prevent the second fastener from dropping through the fastener-feeding tube 60.

As shown in FIG. 6, if a fastener F is inverted (with its head H preceding its shank S when the inverted fastener F is dropped into the fastener-feeding tube 60 via the mouthpiece 130 with the fastener-engaging pawl 100 is positioned in the normal position, the fastener-engaging pawl 100 pivots slightly toward the pivoted position so that the upper and lower arms 102, 104, of the fastener-engaging pawl 100 respectively engage the shank S of the inverted fastener F and the head of the inverted fastener F so as to cause the inverted fastener F and the fastener-engaging pawl 100 to bind but to permit the inverted fastener F to be upwardly pulled from the fastener-feeding tube 60.

The machine 10 is improved over the machines disclosed in the aforementioned Beach et al. patents in the construction of the magazine 40 and associated elements to be next described. The magazine 40, which is integrated with the base 20, is similar to the magazines of the machines disclosed therein in having two side walls 150, 152, a back wall 156 comprising the aforenoted recess 146, a front wall 158 defining a substantially open region 160, which facilitates loading of a stack of the washers W into a cavity 170 defined by the respective walls of the magazine 40, and an upper aperture 160. The magazine 40 is arranged so as to allow a lowermost washer W in such a stack to be laterally displaced from a lower region 162 of the magazine 40, in a manner disclosed in the aforementioned Beach et al. patents.

A bridge 200, which has a proximal end 202 and a distal end 204, is mounted pivotably to the side wall 150, within a recess 206 opening upwardly in the side wall 150. The distal end 204 is adapted to rest within a recess 208 opening upwardly in the side wall 152. The bridge 200 is pivotable between a position wherein the bridge 200 spans the upper aperture 160 of the magazine 40 as shown in FIGS. 7, 8, 11, and 12, and a range of positions wherein the bridge 200 does not span the upper aperture 160 of the magazine 40, as shown in FIGS. 9 and 10.

A circular cover 210 is mounted to the bridge 200 so that the circular cover 210 is inserted into cavity 170 of the magazine 40, beneath the bridge 200, above a stack of the washers W in the cavity 170 of the magazine 40 when the bridge 200 is pivoted to the position wherein the bridge 200 spans the upper aperture 160 of the magazine 40, and so that the circular cover 210 is removed from the cavity 170 of the magazine 40 when the bridge 210 is pivoted to the range of positions wherein the bridge 200 does not span the upper aperture 160 of the magazine 40. The circular cover 210 is mounted adjustably to the bridge 200, via an elongate rod 220, so as to enable the circular cover 210 to be upwardly and downwardly adjusted along the elongate rod 220 between a first position and a second position, the first position becoming a lowered position relative to the bridge 200 when the bridge 200 is pivoted to the position wherein the bridge 200 spans the upper aperture 160 of the magazine 40 and the second position becoming a raised position relative to the bridge 200 when the bridge 200 is pivoted thereto.

Defining an axis, the elongate rod 220 has two ends 222, 224, which become a lower end and an upper end respectively when the bridge 200 is pivoted to the position wherein the bridge 200 spans the upper aperture 160 of the magazine 40. The circular cover 210 has a central hole 212, through which the elongate rod 220 passes, whereby the circular cover 210 is mounted to the elongate rod 220 so as to be axially movable along the elongate rod 220 toward and away from a position near the end that becomes the lower end 222. The end 222 of the elongate rod 220 is peened so as to prevent the circular cover 210 from demounting from the elongate rod 220 at the peened end 222. The elongate rod 220 extends through a hole (not shown) provided in the bridge 200 and through a tubular collar 226, which is affixed to the bridge 200, so as to enable the elongate rod 220 to be moved upwardly and downwardly when the bridge 200 is pivoted to the position wherein the bridge 200 spans the upper aperture 164 of the magazine 40.

A handle 230 having a shank 232 with a projecting pintle 234 is mounted to the other end 224 of the elongate rod 220. As shown in FIG. 7 and also in FIG. 12, the handle 230 is manipulatable so that the projecting pintle 234 coacts with the margins of a J-shaped slot 236 in the tubular collar 226 so as to latch the handle 230 releasably to the tubular collar 226, whereby to latch the elongate rod 220 releasably to a lowered position, in which the elongate rod 220 extends downwardly through the central apertures A of the stacked washers W in the cavity 170 of the magazine 40, when the bridge 200 is pivoted to the position wherein the bridge 200 spans the upper aperture 164 of the magazine 40. A coil spring 240 is deployed around the elongate rod 220, between the shank 232 of the handle 230 and the margins of the aforenoted hole (not shown) provided in the bridge 200, so as to bias the handle 230 upwardly with the elongate rod 220 in the lowered position. The coil spring 240 is fastened at its one end to the shank 232 of the handle 230 and is detached at its other end.

Thus, when the elongate rod 220 is latched in the lowered position, the circular cover 210 is biased gravitationally so as to bias the stacked washers W downwardly in the magazine cavity 170 of the magazine 40. As shown in FIGS. 8, 9, and 10, for purposes of loading a stack of washers W into the cavity 170 of the magazine 40 or for purposes of unloading a stack of washers W from the cavity 170 of the magazine 40, the handle 230 is manipulatable so as to release the handle 230 from the tubular collar 226, whereby to release the elongate rod 220, whereupon the elongate rod 220 can be then raised so as to raise the circular cover 210. When the elongate rod 220 and the circular cover 210 have been raised sufficiently, the bridge 200, the circular cover 210, and the elongate rod 220 can be then pivoted to a position within the range of positions wherein the bridge 200 does not span the upper aperture 164 of the magazine 40.

The machine 10 is improved over the machines disclosed in the aforementioned Beach et al. patents in the construction of the shuttle 50 and associated elements to be next described. The shuttle 50 is similar to the shuttles of the machines disclosed therein in having a longitudinal axis (L—L) and a transverse brace 300 having a pivot pin 302 at each of its opposite ends and in having a transverse rib 310. As disclosed therein, the pivot pins 302 coact with other mechanism of the machine 10 so as to drive the shuttle 50 reciprocatingly between the washer-engaging and washer-releasing positions. As disclosed therein, the transverse brace 300 is disposed across the shuttle 50 and is fixed to the shuttle 50 by a pair of similar, threaded fasteners 302, which are stressed when the shuttle 50 is driven between the washer-engaging and washer-releasing positions. As disclosed therein, the transverse rib 310 is a unitary portion of the shuttle 50, which portion tends to become worn as the machine 10 is used.

However, as improved by this invention, the shuttle 50 has a transverse groove 320 defining a leading edge 322 and a trailing edge 324 and the transverse brace 300 is fixed within the transverse groove 320 by the threaded fasteners 302 so as to bear against the leading and trailing edges 322, 324, when the shuttle 50 is driven between the washer-engaging and washer-releasing positions, and so as to project above the transverse groove 320. Because the transverse brace 300 bears against the leading and trailing edges 322, 324, when the shuttle 50 is driven between the washer-engaging and washer-releasing positions, stresses imposed on the threaded fasteners 302 are reduced significantly.

Moreover, as improved by this invention, the shuttle 50 has a transverse groove 330 and the transverse rib 310 is fixed removably within the transverse groove 330, by a pair of similar, threaded fasteners 332. Thus, as the transverse rib 310 becomes worn, the transverse rib 310 can be readily replaced without a need to replace the shuttle 50 as a whole.

Various modifications may be made in the preferred embodiment described above without departing from the scope and spirit of this invention.

What is claimed is:

1. A roofing washer-dispensing machine for dispensing stackable roofing washers individually, the washer-driving machine comprising (a) a base;

(b) a magazine integrated with the base and adapted to receive a stack of said washers inserted through an upper aperture of the magazine, to hold the stack, and to allow a lowermost washer in the stack to be laterally displaced from a lower region of the magazine, the magazine having two side walls spaced from each other;

(c) a bridge mounted pivotably at a first end of the bridge to a first of the side walls of the magazine so as to be pivotably movable between a position wherein the bridge spans the upper aperture of the magazine and wherein a second end of the bridge rests on the second of the side walls of the magazine and a range of positions wherein the bridge does not span the upper aperture of the magazine; and (c) a cover mounted to the bridge so that the cover is inserted into the magazine, beneath the bridge, above the stack when the bridge is pivoted to the position wherein the bridge spans the upper aperture of the magazine, and so that the cover is removed from the magazine when the bridge is pivoted to the range of positions wherein the bridge does not span the upper aperture of the magazine.

2. The roofing washer-dispensing machine of claim 1 wherein the cover is mounted movably to the bridge so as to enable the cover to be upwardly and downwardly moved when the bridge is pivoted to the position wherein the bridge spans the upper aperture of the magazine.

3. The roofing washer-dispensing machine of claim 2 comprising a rod defining an axis and having two ends that become a lower end and an upper end respectively when the bridge is pivoted to the position wherein the bridge spans the upper aperture of the magazine, the cover being mounted so as to be axially movable along the rod toward and away from a position near the end that becomes the lower end, the rod extending through a hole in the bridge so as to enable the rod to be moved upwardly and downwardly between the lowered and raised positions when the bridge is pivoted to the position wherein the bridge spans the upper aperture of the magazine, the rod being latchable releasably in the position that becomes the lowered position, the cover being biased gravitationally when the bridge is pivoted to the position wherein the bridge spans the upper aperture of the magazine so as to bias a stack of washers downwardly in the magazine.

4. In a roofing washer-dispensing machine for dispensing stackable roofing washers individually, the roofing washer-dispensing machine comprising (a) a magazine adapted to hold a stack of said washers and to allow a lowermost washer of the stack to be laterally displaced from a lower region of the magazine, (b) a shuttle having a longitudinal axis and being adapted to be reciprocatingly driven along its longitudinal axis between a washer-engaging position wherein the shuttle engages the lowermost washer of the stack and a washer-releasing position wherein the shuttle releases the last-mentioned washer, and (c) a transverse brace disposed across the shuttle and fixed to the shuttle by at least one fastener, which is stressed when the shuttle is driven between the washer-engaging and washer-releasing positions, the elongate brace having a pivot pin at each end of the elongate brace, an improvement wherein the shuttle has a transverse groove disposed transverse to the longitudinal axis of the shuttle and defining a leading edge and a trailing edge, the transverse brace being fixed within the transverse groove by said fastener so as to bear against the leading and trailing edges, the transverse brace projecting above the transverse groove.

5. The roofing washer-dispensing machine of claim 4 wherein said fastener is one of a pair of similar fasteners fixing the transverse brace within the transverse groove so as to bear against the leading and trailing edges.

6. In a roofing washer-dispensing machine for dispensing stackable roofing washers individually, the roofing washer-dispensing machine comprising (a) a magazine adapted to hold a stack of said washers and to allow a lowermost washer of the stack to be laterally displaced from a lower region of the magazine and (b) a shuttle having a longitudinal axis and being adapted to be reciprocatingly driven along its longitudinal axis between a washer-engaging position wherein the shuttle engages the lowermost washer of the stack and a washer-releasing position wherein the shuttle releases the last-mentioned washer, the shuttle having a transverse rib adapted to bear against the last-mentioned washer when the shuttle is driven from the washer-engaging position into the washer-releasing position, an improvement wherein the transverse rib is defined by an elongate element fixed removably within and projecting above a transverse groove disposed transverse to the longitudinal axis of the shuttle.

7. The roofing washer-dispensing machine of claim 6 wherein the elongate element is fixed removably within the transverse groove by a pair of similar fasteners.

* * * * *